United States Patent
Chen et al.

(10) Patent No.: US 11,306,036 B2
(45) Date of Patent: Apr. 19, 2022

(54) COMPOSITION CONTAINING A UREASE INHIBITOR

(71) Applicant: RHODIA OPERATIONS, Paris (FR)

(72) Inventors: Zixian Chen, Singapore (SG); Krish Murthy Shanmuga, Plainsboro, NJ (US)

(73) Assignee: RHODIA OPERATIONS, Paris (FR)

( * ) Notice: Subject to any disclaimer, the term of this patent is extended or adjusted under 35 U.S.C. 154(b) by 232 days.

(21) Appl. No.: 16/315,631

(22) PCT Filed: Jul. 5, 2017

(86) PCT No.: PCT/EP2017/066723
§ 371 (c)(1),
(2) Date: Jan. 5, 2019

(87) PCT Pub. No.: WO2018/007426
PCT Pub. Date: Jan. 11, 2018

(65) Prior Publication Data
US 2019/0300452 A1   Oct. 3, 2019

Related U.S. Application Data

(60) Provisional application No. 62/358,268, filed on Jul. 5, 2016.

(51) Int. Cl.
| | |
|---|---|
| *C05G 3/90* | (2020.01) |
| *C05C 9/00* | (2006.01) |
| *A01N 57/02* | (2006.01) |
| *A01N 25/22* | (2006.01) |
| *C09K 15/26* | (2006.01) |

(52) U.S. Cl.
CPC ............... *C05G 3/90* (2020.02); *A01N 25/22* (2013.01); *A01N 57/02* (2013.01); *C05C 9/00* (2013.01); *C09K 15/26* (2013.01); *Y02P 60/21* (2015.11)

(58) Field of Classification Search
CPC .......... C05G 3/90; A01N 57/02; A01N 25/22; C05C 9/00; Y02P 60/21; C09K 15/26; C05B 15/00
See application file for complete search history.

(56) References Cited

U.S. PATENT DOCUMENTS

| | | | |
|---|---|---|---|
| 3,415,908 A | 12/1968 | Bliznjuk et al. | |
| 4,480,692 A | 11/1984 | Stapp | |
| 9,637,420 B2 | 5/2017 | McKnight et al. | |
| 2011/0154874 A1 | 6/2011 | Rahn et al. | |
| 2018/0112103 A1* | 4/2018 | Wallenhorst | ....... C08G 18/3206 |
| 2020/0157018 A1* | 5/2020 | Schmid | ................... C07F 9/224 |

FOREIGN PATENT DOCUMENTS

| | | | | |
|---|---|---|---|---|
| AU | 2012352485 B2 * | 12/2012 | ............... | C05G 1/06 |
| EP | 3109223 B1 * | 8/2018 | ............. | A01C 21/00 |

OTHER PUBLICATIONS

Pubchem, "n-Butylphosphorothioic triamide", 2021, accessed from https://pubchem.ncbi.nlm.nih.gov/compound/93502 (Year: 2021).*
Pubchem2, "2-[2-(Dimethylamino)ethoxy]ethanol", 2021, accessed from https://pubchem.ncbi.nlm.nih.gov/compound/74348 (Year: 2021).*
Federal Register vol. 69, No. 82, pp. 23113-23142, Apr. 28, 2004. Action Memorandum "Inert Reassessment—One Exemption from the Requirement of a Tolerance of Triethyl Phosphate (CAS reg. No. 78-40-0)" dated Jun. 5, 2006 (12 pages total).
SAAPedia "Tributyl Phosphate" accessed Aug. 5, 2020 (4 pages) http://www.saapedia.org/en/saa/?type=detail&id=9101.
SAAPedia "Triethyl Phosphate" accessed Aug. 5, 2020 (3 pages) http://www.saapedia.org/en/saa/?type=detail&id=5903.
Petition for Post-Grant Review for Case No. PGR2019-0046 to U.S. Pat. No. 10,221,108 filed Apr. 26, 2019 (90 pages).
Aug. 10, 2020 PTAB Decision for PGR2019-00046 to U.S. Pat. No. 10,221,108 (54 pages).
John Lopez et al. "N-Butylpyrrolidone As Alternative Solvent For Solid-Phase Peptide Synthesis", Org. Process. Res. Dev., vol. 22, p. 494-503 (2018).

* cited by examiner

*Primary Examiner* — Jennifer A Smith
(74) *Attorney, Agent, or Firm* — Vorys, Sater, Seymour and Pease LLP

(57) ABSTRACT

The present invention relates to a composition comprising: (A) at least one (thio)phosphoric acid triamide and/or (thio)phosphoric acid diamide; (B) at least one amine compound; and optionally (C) a solvent. Said composition can notably be used in urea-containing fertilizers.

17 Claims, No Drawings

COMPOSITION CONTAINING A UREASE INHIBITOR

This application claims priority to U.S. provisional patent application no. 62/358,268 filed on Jul. 5, 2016, the whole content of this application being incorporated herein by reference for all purposes.

TECHNICAL FIELD

The present invention relates to a composition containing at least a urease inhibitor and an amine compound. The present invention also relates to methods for using the composition.

BACKGROUND ART

In the agrochemical industry, farmers use various fertilizers to impart macronutrients to plants either by application to the soil or application to plant leaves. Nitrogen, phosphorus, potassium, calcium, magnesium, and sulfur are macronutrients that must be supplied to the plants and soil manually by farmers. In many crops, the amount of nitrogen supplied is critical to the overall quality and growth of the crop. Nitrogen is typically supplied in the form of nitrogenous, i.e., nitrogen precursor-containing, fertilizer compounds, such as urea, ammonium nitrate, or ammonium phosphate fertilizer compounds. Due to the high water solubility of these salts, however, applied nitrogen values may be lost due to run-off and leaching of the nitrogenous fertilizer compounds. Once applied, the nitrogenous fertilizer compounds are typically degraded, for example, by microorganisms present in the soil, to nitrogenous species such as $NH_4^+$, $NO_2^-$, $NO_3^-$, and ammonia gas, that may be even more readily lost through evaporation, run-off, and leaching than the fertilizer compounds themselves. Such degradation process is known as volatilization. If degradation of the fertilizer compounds occurs at a rate that is faster than the nitrogenous degradation products can be used by the plants, then the nitrogen values in the degradation products are at increased risk of being lost.

Among the nitrogenous fertilizers, urea-containing fertilizers have been widely used. It is known that urease inhibitors, which inhibits or decrease the enzymatic cleavage of urea, can be used for delaying degradation of urea. Use of the urease inhibitors in combination with urea-containing fertilizers can increase the amount of time that the nitrogen source remains in the soil and available for absorption by the plants, which tends to increase the effectiveness of the fertilizers and positively impact crop yield and quality. It is advisable to incorporate the urease inhibitors into the fertilizer particles or to apply the urease inhibitors together with the fertilizers onto or into the soil. Among the most potent known urease inhibitors are N-alkylthiophosphoric acid triamides and N-alkylphosphoric acid triamides, such as N-(n-butyl)thiophosphoric acid triamide (NBPT) and N-(n-propyl)thiophosphoric acid triamide (NPPT).

However, there are problems with use of N-alkylthiophosphoric acid triamides and N-alkylphosphoric acid triamides as urease inhibitors. For example, NBPT is a sticky, waxy, heat and water sensitive material, which is extremely difficult to handle. NBPT, usually used at low concentrations, is difficult to be evenly distributed on fertilizer particles or on/in the soil, and thus should be dispersed or solubilized in a liquid carrier prior to being sprayed onto the fertilizer particles or onto/into the soil. U.S. Pat. No. 5,698,003 discloses the dissolution of NBPT with a glycol such as propylene glycol or ethylene glycol and esters of glycols. U.S. Pat. No. 5,352,265 discloses the dissolution of NBPT in liquid amides such as 2-pyrrolidone or N-alkyl-2-pyrrolidones such as N-methyl-2-pyrrolidone.

Furthermore, NBPT tends to undergo hydrolysis under humid conditions and is thermally unstable. For the commercialization of urea containing fertilizers combined with urease inhibitors, it is often desired to apply the urease inhibitors to the urea-containing fertilizers and to store such treated fertilizers until the time of spreading them onto/into the soil. It remains a challenge to provide a urease inhibitor composition in which the urease inhibitor is stabilized. It remains a challenge to maintain the stability of the urease inhibitor after it has been applied to fertilizers. It also remains a challenge to provide a urea-containing fertilizer which has reduced nitrogen volatilization.

SUMMARY OF INVENTION

The present invention provides a composition comprising:
(A) at least one (thio)phosphoric acid triamide of the general formula (I) and/or (thio)phosphoric acid diamide of the general formula (II)

$$R_1R_2N\text{—}P(X)(NH_2)_2 \qquad (I)$$

$$R_1O\text{—}P(X)(NH_2)_2 \qquad (II)$$

wherein X is oxygen or sulphur;
$R_1$ and $R_2$ is independently selected from the group consisting of hydrogen, substituted or unsubstituted 2-nitrophenyl, $C_{1-10}$ alkyl, $C_{3-10}$ cycloalkyl, $C_{3-10}$ heterocycloalkyl, $C_{6-10}$ aryl, $C_{6-10}$ heteroaryl and diaminocarbonyl, or $R_1$ and $R_2$, together with the nitrogen atom joining them, form a 5- or 6-membered saturated or unsaturated heterocyclic moiety, which optionally contains one or two further heteroatoms selected from the group consisting of nitrogen, oxygen and sulphur; and
(B) at least one amine compound.

Said composition may further comprise a solvent.

The present invention also provides a urea-containing fertilizer comprising said composition.

The present invention further provides use of said composition as an additive or a coating material for a urea-containing fertilizer.

DETAILED DESCRIPTION

Throughout the description, including the claims, the term "comprising one" or "comprising a" should be understood as being synonymous with the term "comprising at least one", unless otherwise specified, and "between" should be understood as being inclusive of the limits.

It should be noted that in specifying any range of concentration, weight ratio or amount, any particular upper concentration, weight ratio or amount can be associated with any particular lower concentration, weight ratio or amount, respectively.

As used herein, the term "alkyl" means a saturated hydrocarbon radical, which may be straight, branched or cyclic, such as methyl, ethyl, n-propyl, iso-propyl, n-butyl, sec-butyl, t-butyl, pentyl, n-hexyl, cyclohexyl.

As used herein, the term "hydroxyalkyl" means an alkyl radical, which is substituted with a hydroxyl groups, such as hydroxymethyl, hydroxyethyl, hydroxypropyl, and hydroxydecyl.

As used herein, the term "cycloalkyl" means a saturated hydrocarbon radical that includes one or more cyclic alkyl rings, such as cyclopentyl, cyclooctyl, and adamantanyl.

As used herein, the term "heterocyclic moiety" includes closed ring structures analogous to carbocyclic groups in which one or more of the carbon atoms in the ring is an element other than carbon, for example, nitrogen, sulfur, or oxygen. Heterocyclic moieties may be saturated or unsaturated. Heterocyclic moieties include heterocycloalkyl moieties. Additionally, heterocyclic moieties, such as pyrrolyl, pyridyl, isoquinolyl, quinolyl, purinyl, and furyl, may have aromatic character, in which case they may be referred to as "heteroaryl" or "heteroaromatic" moieties.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkenyl, halo, haloalkyl, or amino, such as phenoxy, phenyl, methylphenyl, dimethylphenyl, trimethylphenyl, chlorophenyl, trichloromethylphenyl, aminophenyl.

As used herein, the term "alkoxy" refers to groups of from 1 to 20 carbon atoms of a straight, branched, cyclic configuration and combinations thereof attached to the parent structure through an oxygen.

As used herein, the terminology "($C_{x-y}$)" in reference to an organic group, wherein x and y are each integers, indicates that the group may contain from x carbon atoms to y carbon atoms per group.

The present invention provides a composition comprising:

(A) at least one (thio)phosphoric acid triamide of the general formula (I) and/or (thio)phosphoric acid diamide of the general formula (II):

$$R_1R_2N-P(X)(NH_2)_2 \quad (I)$$

$$R_1O-P(X)(NH_2)_2 \quad (II)$$

wherein X is oxygen or sulphur;
$R_1$ and $R_2$ is independently selected from the group consisting of hydrogen, substituted or unsubstituted 2-nitrophenyl, $C_{1-10}$ alkyl, $C_{3-10}$ cycloalkyl, $C_{3-10}$ heterocycloalkyl, $C_{6-10}$ aryl, $C_{6-10}$ heteroaryl and diaminocarbonyl, or $R_1$ and $R_2$, together with the nitrogen atom joining them, form a 5- or 6-membered saturated or unsaturated heterocyclic moiety, which optionally contains one or two further heteroatoms selected from the group consisting of nitrogen, oxygen and sulphur;
(B) at least one amine compound selected from:
(B1) a compound having the general formula (III)

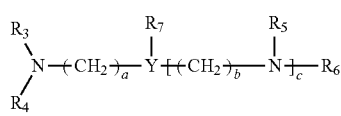

(III)

wherein:
Y is nitrogen or oxygen atom;
a and b is independently an integer of 2 to 6;
c is an integer of 1 to 10;
$R_3$, $R_4$, $R_5$ and $R_6$ is independently a $C_{1-4}$ alkyl or hydroxylalkyl group, a $C_{1-4}$ alkoxyl group or H; preferably, $R_3$, $R_4$, and $R_6$ is independently a $C_{1-4}$ alkyl or hydroxylalkyl group, a $C_{1-4}$ alkoxyl group, $R_5$ is a $C_{1-4}$ alkyl or hydroxylalkyl group, a $C_{1-4}$ alkoxyl group or H;
$R_7$ is H, a $C_{1-4}$ alkyl or hydroxylalkyl group, a $C_{1-4}$ alkoxyl group when Y is nitrogen, $R_7$ is null when Y is oxygen;
(B2) a compound having the general formula (IV)

(IV)

wherein:
d is an integer of 2 to 6;
e is an integer of 2 to 50 when d=2, e is an integer of 1 to 50 when d=3-6;
$R_8$ and $R_9$, same or different, is a $C_{1-4}$ alkyl group, or $R_8$ and $R_9$, same or different, is a $C_{1-4}$ hydroxylalkyl group, or $R_8$ and $R_9$, same or different, is a $C_{1-4}$ alkoxyl group;
$R_{10}$ is H or a $C_{1-4}$ alkyl group;
(B3) a compound having the general formula (V)

(V)

wherein:
f is an integer of 3 to 6;
$R_{11}$, $R_{12}$, $R_{13}$ and $R_{14}$ is independently a $C_{1-4}$ alkyl or hydroxylalkyl group, a $C_{1-4}$ alkoxyl group or H, wherein at least one of $R_{11}$, $R_{12}$, $R_{13}$ and $R_{14}$ is a $C_{1-4}$ hydroxylalkyl group, a $C_{1-4}$ alkoxyl group or H; preferably, $R_{11}$ and $R_{12}$ is independently a $C_{1-4}$ alkyl or hydroxylalkyl group, a $C_{1-4}$ alkoxyl group, $R_{13}$ and $R_{14}$ is independently a $C_{1-4}$ alkyl or hydroxylalkyl group, a $C_{1-4}$ alkoxyl group or H, wherein at least one of $R_{11}$, $R_{12}$, $R_{13}$ and $R_{14}$ is a $C_{1-4}$ hydroxylalkyl group, a $C_{1-4}$ alkoxyl group or H;
(B4) a compound having the general formula (VI)

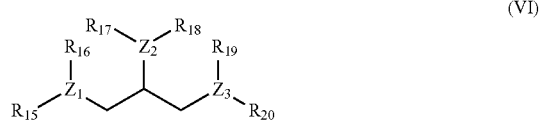

(VI)

wherein:
$Z_1$, $Z_2$, $Z_3$ is independently nitrogen or oxygen atom, wherein at least one of $Z_1$, $Z_2$, $Z_3$ is nitrogen atom;
$R_{15}$, $R_{16}$, $R_{17}$, $R_{18}$, $R_{19}$ and $R_{20}$ is independently a $C_{1-12}$ alkyl or hydroxylalkyl group, a $C_{1-12}$ alkoxyl group, H or null.

It has been surprisingly found that the (thio)phosphoric acid triamide and/or the (thio)phosphoric acid diamide, when incorporated in the composition of the present invention, exhibit satisfactory stability even after the composition is contacted with fertilizers. It has been found that the composition of the present invention can effectively reduce the nitrogen volatilization in the fertilizers, even after the fertilizers have been stored for a long time.

Used as component A is at least one (thio)phosphoric acid triamide of the general formula (I) and/or (thio)phosphoric acid diamide of the general formula (II). These may be individual compounds or else mixtures of two or more such compounds. Such compounds can notably function as urease inhibitors.

$R_1$ and $R_2$ may each be unsubstituted or substituted, by halogen and/or nitro, for example.

In the general formula (I) or (II), the $C_{1-10}$ alkyl group may be methyl, ethyl, propyl, isopropyl, n-butyl, isobutyl, sec-butyl, tert-butyl, pentyl, isopentyl, neopentyl, tert-pentyl, hexyl, 2-methylpentyl, heptyl, octyl, 2-ethylhexyl, isooctyl, nonyl, isononyl, decyl and isodecyl. The cycloalkyl group may be selected from cyclopropyl, cyclobutyl, cyclopentyl, cyclohexyl and cyclooctyl; the aryl group may be selected from phenyl or naphthyl, or, in substituted form, 2-nitrophenyl. Examples of the heterocyclic moieties $R_1R_2N$— are piperazinyl, morpholinyl, pyrrolyl, pyrazolyl, triazolyl, oxazolyl, thiazolyl or imidazolyl groups.

One example of compounds of the general formula (II) is phenyl phosphorodiamidate.

Preferably, component A is N-alkylthiophosphoric acid triamide (with X=S and $R_2$=H) or N-alkylphosphoric acid triamide (with X=O and $R_2$=H).

Advantageously, component A comprises N-(n-butyl) thiophosphoric acid triamide (NBPT) as an active compound. Component A preferably comprises another one or more active compounds which may be a derivative selected from the group consisting of N-cyclohexyl-, N-pentyl-, N-isobutyl- and N-propylphosphoric acid triamide and corresponding thiophosphoric acid triamides. One particularly preferred example of component A is a mixture of N-(n-butyl)thiophosphoric acid triamide (NBPT) and N(n-propyl) thiophosphoric acid triamide (NPPT). Component A may contain NBPT in amounts of 40% to 95% by weight, preferably of 60% to 80% by weight, based on the total amount of active compounds in component A.

Thiophosphoric acid triamides are known to be relatively easily hydrolyzed to the corresponding phosphoric acid triamides. Since, generally speaking, moisture cannot be entirely excluded, thiophosphoric acid triamide and the corresponding phosphoric acid triamide are frequently present in a mixture with one another. In the context of the present application, therefore, the term "(thio)phosphoric acid triamide" refers to not only the pure thiophosphoric acid triamides and phosphoric acid triamides but also mixtures thereof.

The compounds described herein as component A can be prepared, for example, by known methods from thiophosphoryl chloride, primary or secondary amines, and ammonia, as described in U.S. Pat. No. 5,770,771, for example. In such a reaction, in a first step, thiophosphoryl chloride is reacted with one equivalent of a primary or secondary amine, in the presence of a base, and the product is then reacted with an excess of ammonia to give the end product.

Other suitable urease inhibitors may be heterocyclically substituted (thio)phosphoric acid triamides, N-(2-pyrimidinyl)(thio)phosphoric acid triamides and N-phenylphosphoric acid triamides.

Component B may be an amine compound or a mixture of more than one amine compounds. Suitable amine compounds can be selected from those according to the general formula (III), (IV), (V) or (VI).

Referring to the general formula (III)

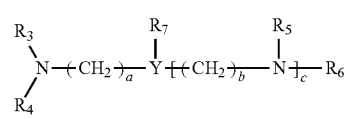

(III)

Y may be nitrogen or oxygen atom.

a and b is independently an integer of 2 to 6 and c is an integer of 1 to 10. Preferably, a and b is independently an integer of 2 to 6 and c is 1. More preferably, a and b is independently an integer of 2 to 4 and c is 1.

$R_3$, $R_4$, $R_5$ and $R_6$ may independently be a $C_{1-4}$ alkyl or hydroxylalkyl group, such as methyl, ethyl, propyl, isopropyl, n-butyl, isobutyl, sec-butyl, tert-butyl, hydroxymethyl, hydroxyethyl, hydroxypropyl and hydroxybutyl. $R_3$, $R_4$, $R_5$ and $R_6$ may also independently be a $C_{1-4}$ alkoxyl group such as methoxy, ethoxy, n-propoxy, isopropoxy, n-butoxy, iso-butoxy, sec-butoxy and tert-butoxy. Alternatively, $R_3$, $R_4$, $R_5$ and $R_6$ may be H.

Preferably, $R_3$, $R_4$, and $R_6$ are independently a $C_{1-4}$ alkyl or hydroxylalkyl group, a $C_{1-4}$ alkoxyl group, $R_5$ is a $C_{1-4}$ alkyl or hydroxylalkyl group, a $C_{1-4}$ alkoxyl group or H.

More preferably, $R_3$, $R_4$, $R_5$ and $R_6$ is independently a $C_{1-4}$ alkyl group. In particular, $R_3$, $R_4$, $R_5$ and $R_6$ are methyl.

When Y is nitrogen, $R_7$ is H, a $C_{1-4}$ alkyl or hydroxylalkyl group, a $C_{1-4}$ alkoxyl group; preferably, $R_7$ is H, a $C_{1-4}$ alkyl or hydroxylalkyl group; in particular, $R_7$ is H, methyl or 2-hydroxyl-propyl group.

$R_7$ is null when Y is oxygen.

Notably, the amine compound may be represented by general formula (VII):

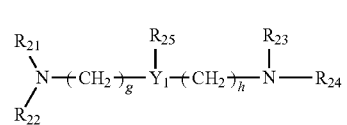

(VII)

wherein:

$Y_1$ is nitrogen or oxygen atom, g and h is independently an integer of 2-6, preferably 2 and 3;

$R_{21}$, $R_{22}$, $R_{23}$, $R_{24}$ is independently a $C_{1-4}$ alkyl or hydroxylalkyl group, such as methyl, ethyl, propyl, iso-propyl, butyl, iso-butyl, hydroxymethyl, hydroxyethyl, hydroxypropyl and hydroxybutyl, or a $C_{1-4}$ alkoxyl group, such as methoxy, ethoxy, n-propoxy, isopropoxy, n-butoxy, iso-butoxy, sec-butoxy and tert-butoxy, or H;

preferably, $R_{21}$, $R_{22}$, $R_{24}$ is independently a $C_{1-4}$ alkyl or hydroxylalkyl group, or a $C_{1-4}$ alkoxyl group, $R_{23}$ is a $C_{1-4}$ alkyl or hydroxylalkyl group, a $C_{1-4}$ alkoxyl group or H;

preferably, $R_{21}$, $R_{22}$, $R_{23}$, $R_{24}$ is independently a $C_{1-4}$ alkyl group;

in particular, $R_{21}$, $R_{22}$, $R_{23}$, $R_{24}$ are methyl;

$R_{25}$ is H, a $C_{1-4}$ alkyl or hydroxylalkyl group, a $C_{1-4}$ alkoxyl group when $Y_1$ is nitrogen;

preferably, $R_{25}$ is H, a $C_{1-4}$ alkyl or hydroxylalkyl group when $Y_1$ is nitrogen, in particular, $R_{25}$ is H, methyl or 2-hydroxyl-propyl group when $Y_1$ is nitrogen; $R_{25}$ is null when $Y_1$ is oxygen.

Examples according to the general formula (III) include but are not limited to:
3,3'-Iminobis(N,N-dimethylpropylamine),
1-[bis[3-(dimethylamino)propyl]amino]-2-propanol,
bis[2-(N,N-dimethylamino)ethyl] ether,
N,N,N',N'',N''-pentamethyldiethylene triamine.

Referring to the general formula (IV)

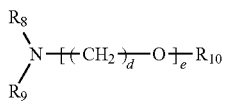 (IV)

$d$ is an integer of 2 to 6, preferably 2 to 4, in particular $d=2$;
$e$ is an integer of 2 to 50 when $d=2$, preferably of 2 to 10;
$e$ is an integer of 1 to 50 when $d=3$ to 6, preferably of 1 to 10.

In the general formula (IV), $R_8$ and $R_9$, same or different, is a $C_{1-4}$ alkyl group, such as methyl, ethyl, propyl, isopropyl, n-butyl, isobutyl, sec-butyl, tert-butyl; or $R_8$ and $R_9$, same or different, is a $C_{1-4}$ hydroxylalkyl group, such as hydroxymethyl, hydroxyethyl, hydroxypropyl and hydroxybutyl; or $R_8$ and $R_9$, same or different, is a $C_{1-4}$ alkoxyl group, such as methoxy, ethoxy, n-propoxy, isopropoxy, n-butoxy, iso-butoxy, sec-butoxy and tert-butoxy. Preferably, $R_8$ and $R_9$, same or different, is a $C_{1-4}$ alkyl group. In particular, $R_8$ and $R_9$ are methyl.

$R_{10}$ is H or a $C_{1-4}$ alkyl group.

Examples of amine compounds according to the general formula (IV) include but are not limited to: 2-(2-(dimethylamino)ethoxy)ethanol, 3-methoxy 1-propylamine, 2-(2-aminoethoxy)ethanol.

Referring to the general formula (V)

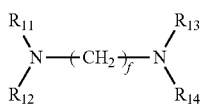 (V)

$f$ is an integer of 3 to 6, in particular $f=3$ or 4.

In the general formula (V), $R_{11}$, $R_{12}$, $R_{13}$ and $R_{14}$ is independently a $C_{1-4}$ alkyl or hydroxylalkyl group, such as methyl, ethyl, propyl, isopropyl, n-butyl, isobutyl, sec-butyl, tert-butyl, hydroxymethyl, hydroxyethyl, hydroxypropyl and hydroxybutyl; a $C_{1-4}$ alkoxyl group, such as methoxy, ethoxy, n-propoxy, isopropoxy, n-butoxy, iso-butoxy, sec-butoxy and tert-butoxy; or H. It is appreciated that at least one of $R_{11}$, $R_{12}$, $R_{13}$ and $R_{14}$ is a $C_{1-4}$ hydroxylalkyl group, a $C_{1-4}$ alkoxyl group or H, that is to say at least one of $R_{11}$, $R_{12}$, $R_{13}$ and $R_{14}$ is not an alkyl group.

Preferably, $R_{11}$ and $R_{12}$ is independently a $C_{1-4}$ alkyl or hydroxylalkyl group, a $C_{1-4}$ alkoxyl group; $R_{13}$ and $R_{14}$ is independently a $C_{1-4}$ alkyl or hydroxylalkyl group, a $C_{1-4}$ alkoxyl group or H; wherein at least one of $R_{11}$, $R_{12}$, $R_{13}$ and $R_{14}$ is a $C_{1-4}$ hydroxylalkyl group, a $C_{1-4}$ alkoxyl group or H;

In one exemplary embodiment, $R_{11}$ and $R_{12}$ is independently a $C_{1-4}$ alkyl group, $R_{13}$ and $R_{14}$ are H. In another exemplary embodiment, $R_{11}$ and $R_{12}$ is independently a $C_{1-4}$ hydroxylalkyl group, $R_{13}$ and $R_{14}$ are H.

Examples of the amine compound according to the general formula (V) include but are not limited to: 3-dimethylaminopropylamine, 3-diethylamino 1-propylamine, N-(3-dimethylaminopropyl)-N,N-diisopropanolamine, N,N,N'-trimethylaminoethyl-ethanolamine.

Referring to (VI):

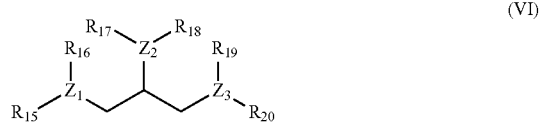 (VI)

$Z_1$, $Z_2$, $Z_3$ is independently nitrogen or oxygen atom, wherein at least one of $Z_1$, $Z_2$, $Z_3$ is nitrogen atom, for example, $Z_1$ is nitrogen, and $Z_2$, $Z_3$ are oxygen. Alternatively, $Z_1$, $Z_2$ are nitrogen and $Z_3$ is oxygen.

In the general formula (VI), $R_{15}$, $R_{16}$, $R_{17}$, $R_{18}$, $R_{19}$ and $R_{20}$ is independently a $C_{1-12}$ alkyl or hydroxylalkyl group, a $C_{1-12}$ alkoxyl group, H or null.

Preferably, $R_{15}$, $R_{16}$, $R_{17}$, $R_{18}$, $R_{19}$ and $R_{20}$ is independently a $C_{1-4}$ alkyl group, H or null.

Notably, the amine compound may be represented by general formula (VIII):

 (VIII)

wherein $R_{26}$ and $R_{27}$ is independently a $C_{1-12}$ alkyl or hydroxylalkyl group, a $C_{1-12}$ alkoxyl group or H. Preferably, $R_{26}$ and $R_{27}$ is independently a $C_{1-4}$ alkyl or hydroxylalkyl group, a $C_{1-4}$ alkoxyl group or H.

Examples of the amine compound according to the general formula (VI) include but are not limited to: 3-aminopropane-1,2-diol, 2-amino-1,3-propanediol, 3-(dimethylamino)-1,2-propanediol, 3-methylamino-1,2-propanediol, 1,3-diamino-2-propanol, 3-aminopropane-1,2-diol.

The composition of the invention may comprise only components A and B. In such case, component B may possibly serve as a solvent for component A, resulting in a liquid or easily meltable composition, which may be conveniently spread onto/into the soil or sprayed on fertilizer particles. It is also possible in accordance with the invention to use solid mixtures which incorporates components A and B, and also mixtures in emulsion or dispersion form.

Advantageously, the composition of the invention further comprise, as component C, a solvent for the (thio)phosphoric acid triamide and/or the (thio)phosphoric acid diamide. In that case it is possible to use all suitable solvents. Solvents contemplated are generally those compounds which are polar and hence have sufficient solvency for the (thio)phosphoric acid triamides and/or the (thio)phosphoric acid diamide. They ought preferably to have a sufficiently high boiling point, and so, on application, the evaporation of sizable quantities of the solvent is unlikely.

Examples of the solvent include but are not limited to: dichloromethane, dimethyl acetamide, dimethyl formamide, dimethyl sulfoxide, methyl-5-(dimethylamino)-2-methyloxopentanoate, ethyl acetate, hexamethylphosphoramide, dimethyl sulfone, sulfolane, 1,3-dimethyl-2-imidazoidinone, 1,3-dimethyl-3,4,5,6-tetrahydro-2(1H)-pyrimidone, methyl acetate, ethyl lactate, methylpyrrolidone, tetrahydrofuran, propylene carbonate, liquid amides, 2-pyrrolidone and N-alkyl-2-pyrrolidones such as NMP and a mixture thereof.

The solvent may notably be a glycol or polyglycol. Examples of suitable glycols are propylene glycol and dipropylene glycol. The glycols may be described generally as terminal $C_{2-10}$ alkylenediols. Examples of other glycols are neopentyl glycol, pinacol, 2,2-diethyl-1,3-propanediol, 2-ethyl-1,3-hexanediol, 2-ethyl-2-butyl-1,3-propanediol, isobutene glycol, 2,3-dimethyl-1,3-propanediol, 1,3-diphenyl-1,3-propanediol, 3-methyl-1,3-butanediol. Examples of cyclic glycols are 1,4-cyclohexanedimethanol and p-xylylene glycol. Examples of polyglycols are polyethylene glycol and polypropylene glycols. Suitable derivatives may be esters such as stearates or caprylates. Use may also be made, for example, of glycerol or glyceryl esters.

The solvent may be a dibasic ester solvent, typically a dialkyl ester of a dicarboxylic acid, more typically, the di $C_{1-12}$ alkyl ester of a saturated linear or branched $C_{2-8}$ aliphatic carboxylic acid or a mixture thereof. The dibasic ester solvent may be represented by the general formula (IX):

$$R_{28}OOC-A-CONR_{29}R_{30} \quad (IX)$$

wherein:
A is a divalent linear or branched $C_{2-8}$ aliphatic group, and $R_{28}$, $R_{29}$ and $R_{30}$ is independently a $C_{1-12}$ alkyl, $C_{1-12}$ aryl, $C_{1-12}$ alkaryl or $C_{1-12}$ arylalkyl. $R_{29}$ and $R_{30}$ may each optionally be substituted with one or more hydroxyl groups.

The solvent may be an amino alcohol. The amine alcohol may be a linear, branched, or cyclic, saturated or unsaturated hydrocarbon that is substituted on at least one carbon atom with an amino group and on at least one other carbon atom with hydroxyalkyl or hydroxyl group, such as monoethanolamine, ethylaminoethanol, dimethylaminoethanol, isopropylaminoethanol, diethanolamine, triethanolamine, methylaminoethanol, aminopropanol, methylaminopropanol, dimethylaminopropanol, aminobutanol, dimethylaminobutanol, aminobutanediol, trihydroxymethylaminoethane, diethylaminopropanediol, 1-amino-cyclopentane methanol, and aminobenzyl alcohol, or a heterocyclic ring that comprises at least one nitrogen atom as a ring member and/or is substituted on at least one carbon atom with an amino group and that is substituted on at least one other carbon atom with a hydroxyalkyl or hydroxyl group, such as methylaminomethyl-1,3-dioxolane.

The solvent may be a heterocyclic alcohol solvent, for example, 5- or 6-membered heterocyclic rings that include 1 or 2 oxygen atoms as ring member, that are substituted on at least one carbon atom of the ring with a $C_{1-6}$ hydroxyalkyl group, and that may optionally be substituted on one or more carbon atoms of the ring with one or more $C_{1-4}$ alkyl groups. It is understood that the term heterocyclic alcohol includes dioxolane compound. The dioxolane compound suitable for the present invention may have the general formula (X):

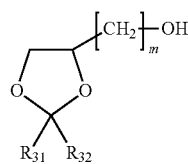

(X)

wherein:
m is an integer of 1 to 10;
$R_{31}$ and $R_{32}$ is independently H, a $C_{1-10}$ alkyl group, a $C_{1-10}$ alkenyl group, or a phenyl group.

One example of the suitable dioxolane compounds is 2,2-dimethyl-4-hydroxymethyl-1,3-dioxolane.

The solvent may also be an organophosphate compound having the general formula (XI):

(XI)

wherein $R_{33}$, $R_{34}$ and $R_{35}$, is independently chosen from H, a $C_{1-16}$ alkyl group, a $C_{1-16}$ alkenyl group, a $C_{1-16}$ alkoxyalkyl group, a $C_{7-30}$ alkylarylalkyl group, a $C_{7-30}$ arylalkyl group, and an aryl group;
provided that at least one of $R_{33}$, $R_{34}$ and $R_{35}$ is not H.

The organophosphate compound may be triethylphosphate, for example.

The composition of the present invention can be prepared by simple mixing of components A, B and, where used, the solvent and other optional ingredients. This mixing may be carried out at an elevated temperature of 30 to 60° C. The sequence in which the individual components are added in this procedure is arbitrary. Where a solvent and the optional ingredients are used, typically, components A and B are first dissolved in the solvent, and then the optional ingredients are introduced. Where it is necessary to heat the mixtures in the course of the preparation process, it is preferred to add component A last.

The fraction of the urease inhibitor (component A) is preferably 1% to 90% by weight, more preferably 10% to 40% by weight, more particularly 15% to 30% by weight, based on the total weight of the composition. The fraction of the amine compound (component B) is preferably 1% to 50% by weight, more preferably 2% to 25% by weight, more particularly 3% to 15% by weight, based on the total weight of the composition. Where a solvent is used as well, as component C, the fraction of the solvent is preferably 10% to 94% by weight, more preferably 20% to 88% by weight, more particularly 30% to 82% by weight, based on the total weight of the composition.

As an alternative it is also possible to provide the composition of the present invention as a solid formulation. In such case, the composition may comprise adjuvants such as fillers, binders or granulating assistants such as lime, gypsum, silicon dioxide or kaolinite.

The composition of the present invention may further comprise a polymer, either in dissolved or dispersed form. Preferred polymers are those which do not enter into any chemical reactions with components A and B. The polymers may be in solution, in emulsion or in dispersed form. It is preferred to use soluble polymers, which preferably have a number-average molecular weight of at least 5000. Suitable polymers may originate from vinylic monomers, as for example from styrenes or (meth)acrylates or acrylonitrile. It is possible, by way of example, to use soluble polystyrenes, soluble polystyrene-acrylonitrile polymers, or else polymers of this kind comprising graft rubbers. Polyesters or polyalkylene glycols, for example, may additionally be used. The stabilization of the urease inhibitors of component A is further improved by the addition of the polymers.

The composition of the invention may further comprise a nitrification inhibitor. Such nitrification inhibitor can be used with the urea-containing fertilizer to slow the process of ammonium conversion to nitrate, and subsequently the loss of nitrate to leeching, thus making ammonium available to plants in the soil for longer periods of time. Ammonium is one of the main forms of nitrogen that can be utilized by plants. Increasing the amount of time that the nitrogen is available to the plant increases the effectiveness of the fertilizer which positively impacts crop yield and quality. Non limiting examples of the nitrification inhibitor include but are not limited to, dicyandiamide, sodium thiosulfate (ST), 2-chloro-6-trichloromethylpyridine, 3,4-dimethylpyrazole phosphate, 3-methylpyrazole (MP); 1-H-1,2,4-triazole (TZ); 3-methylpyrazole-1-carboxamide (CMP); 4-amino-1,2,4-triazole; 3-amino-1,2,4-triazole; 2-cyanimino-4-hydroxy-6-methylpyrimidine (CP); 2-ethylpyridine; N-2,5-dichlorophenyl succinanilic acid (DCS), ammonium thiosulfate; thiophosphoryl triamide; thiourea (TU); guanylthiourea (GTU); ammonium polycarboxilate; ethylene urea; hydroquinone; phenylacetylene; phenylphosphoro diamidate; neem; calcium carbide; 5-ethoxy-3-trichloromethyl-1,2,4-thiadiazol (etridiazol; terraole); 2-amino-4-chloro-6-methylpyrimidine (AM); 1-mercapto-1,2,4-triazole (MT); 2-mercaptobenzothiazole; 2-sulfanilamidothiazole (ST); 5-amino-1,2,4-thiadiazole; 2,4-diamino-6-trichloromethyl-s-triazine (CL-1580); nitroaniline, and chloroaniline. The nitrification inhibitor suitable for the present invention may also be a natural nitrification inhibitor, such as neem, including neem oil, neem cake and neem powder; koronivia, including koronivia grass; karanj, including karanjin seed extract and karanj oil; mint, including mint oil; and any combination thereof.

The composition of the present invention may be spread before, after or together with a fertilizer, notably a urea-containing fertilizer. The composition may in that case be metered separately from the urea-containing fertilizer. More frequently, the composition according to the invention is incorporated into the urea-containing fertilizer, in a melt, for example, or is applied as a coating material to the urea-containing fertilizer. When being used as an additive for the urea-containing fertilizer, the composition of the present invention is preferably used in an amount of 0.01% to 5% by weight, based on the weight of the urea-containing fertilizer.

Accordingly, the present invention provides use of the composition described herein as an additive or a coating material for a urea-containing fertilizer. The composition can function to reduce the nitrogen volatilization of the urea-containing fertilizer. The present invention also provides a method for reducing the nitrogen volatilization of a urea-containing fertilizer by contacting said urea-containing fertilizer with the composition described herein.

The present invention also provides a urea-containing fertilizer comprising the composition as described herein. In the urea-containing fertilizer, the composition is preferably applied to the surface of the urea-containing fertilizer. The composition is preferably present in an amount such that the total amount of component A, based on the urea present, is 0.01% to 0.5% by weight. The amount of component A, based on the urea present is more preferably 0.01% to 0.3% by weight, more particularly 0.02% to 0.2% by weight. The urea-containing fertilizer may further comprise one or more other active compounds, such as herbicides, fungicides, insecticides, growth regulators, hormones, pheromones or other plant protection agents or soil adjuvants. The amounts of such active compounds may vary in the range of from 0.01% to 20% by weight.

The composition of the present invention, in either liquid or solid form, may be mixed with the urea-containing fertilizer. Alternatively, the composition may be incorporated by granulation, compacting or prilling, by addition to the fertilizer or to a mash or melt. Advantageously, the composition is applied to the surface of existing granules, compacts or prills of the urea-containing fertilizer, by means of spraying, powder application or impregnating, for example. This can also be done using further auxiliaries such as adhesive promoters or encasing materials. Examples of apparatuses suitable for performing such application include plates, drums, mixers or fluidized-bed apparatus, although application may also take place on conveyor belts or their discharge points or by means of pneumatic conveyors for solids. A concluding treatment with anticaking agents and/or antidust agents is likewise possible.

The term "urea-containing fertilizer", as used herein, means, first of all, urea itself. In customary commercial fertilizer quality, this urea has a purity of at least 90%, and may for example be in crystalline, granulated, compacted, prilled or ground form. In addition, the term is also intended to encompass mixtures of urea with one or more further nitrogen fertilizers such as ammonium sulfate, ammonium nitrate (such as UAN 18, UAN 28, UAN 30 and UAN 32), ammonium chloride, cyanamide, dicyandiamide (DCD) or calcium nitrate, and also slow-release fertilizers, examples being urea-formaldehyde, urea-acetaldehyde or urea-glyoxal condensates. Also included, furthermore, are urea-containing multinutrient fertilizers which as well as nitrogen also comprise at least one further nutrient such as phosphorus, potassium, magnesium, calcium or sulfur. Also present as well may be the trace elements boron, iron, copper, zinc, manganese or molybdenum. Urea-containing multinutrient fertilizers of this kind may likewise be in granulated, compacted, prilled or ground form or in the form of a crystal mixture. Also encompassed, furthermore, are liquid, urea-containing fertilizers, such as ammonium nitrate-urea solution or else liquid manure.

Should the disclosure of any patents, patent applications, and publications which are incorporated herein by reference conflict with the description of the present application to the extent that it may render a term unclear, the present description shall take precedence.

EXAMPLES

Materials
3,3'-Iminobis(N,N-dimethylpropylamine) (TMBPA);
3-dimethylaminopropylamine (DMAPA);
3-aminopropane-1,2-diol;
1-[bis[3-(dimethylamino)propyl]amino]-2-propanol;
bis[2-(N,N-dimethylamino)ethyl] ether;
2-(2-(dimethylamino)ethoxy)ethanol;
N,N,N',N",N"-pentamethyldiethylene triamine;
N,N,N',N'-tetramethyl-1,3-propanediamine;
N-(n-butyl)thiophosphoric acid triamide (NBPT);
Augeo® SL 191 (from the Solvay Company).

Example 1

The sample was prepared by mixing 6.00 g of TMBPA and 8.11 g of NBPT (98% purity) in 15.89 g of Augeo® SL 191 at a temperature of 25° C. The concentration of TMBPA was 20% and the concentration of NBPT was 26.5%. Then, the solution prepared was sprayed onto 50 g of granulated urea at a dosage of 0.3% of urea weight.

For stability tests, the treated granulated urea was kept at 40° C. and an atmospheric humidity of 50% for 30 days, 60 days and 90 days, respectively. The remaining NBPT content (expressed as percentages based on initial NBPT content) was measured by using HPLC analysis according to the standard procedure.

Example 2

The procedures were same as those in example 1, except that the sample was prepared by mixing 6.00 gram of DMAPA and 8.11 gram of NBPT.

Example 3

The procedures were same as those in example 1, except that the sample was prepared by mixing 6.00 gram of 3-aminopropane-1,2-diol and 8.11 gram of NBPT.

Example 4

The procedures were same as those in example 1, except that the sample was prepared by mixing 6.00 gram of 1-[bis[3-(dimethylamino)propyl]amino]-2-propanol and 8.11 gram of NBPT.

Example 5

The procedures were same as those in example 1, except that the sample was prepared by mixing 6.00 gram of bis[2-(N,N-dimethylamino)ethyl] ether and 8.11 gram of NBPT.

Example 6

The procedures were same as those in example 1, except that the sample was prepared by mixing 6.00 gram of 2-(2-(dimethylamino)ethoxy)ethanol and 8.11 gram of NBPT.

Example 7

The procedures were same as those in example 1, except that the sample was prepared by mixing 6.00 gram of N,N,N',N'',N''-pentamethyldiethylene triamine and 8.11 gram of NBPT.

Comparative Example 1

The procedures were same as those in example 1, except that the sample was prepared by dissolving 8.11 gram of NBPT in 21.89 gram of solvent without addition of any amine compound.

Comparative Example 2

The procedures were same as those in example 1, except that the sample was prepared by mixing 6.00 gram of N,N,N',N'-tetramethyl-1,3-propanediamine and 8.11 gram of NBPT.

The NBPT contents which remained in the urea composition samples after the storage were shown in Table 1 below:

TABLE 1

| Formulation | NBPT Content (30 days) | NBPT Content (60 days) | NBPT Content (90 days) |
|---|---|---|---|
| Example 1 | 89.93% | 82.19% | 71.53% |
| Example 2 | 80.67% | 68.70% | 67.19% |
| Example 3 | 88.68% | 76.36% | 66.33% |
| Example 4 | 70.01% | 70.15% | 63.64% |
| Example 5 | 81.12% | 54.94% | 37.63% |
| Example 6 | 88.40% | 55.27% | 39.39% |
| Example 7 | 79.73% | 57.69% | 52.51% |
| Comparative Example 1 | 54.95% | 21.35% | 13.40% |
| Comparative Example 2 | 33.25% | 27.28% | 15.76% |

As shown in Table 1, NBPT incorporated in the compositions according to the present invention exhibited excellent stability after application to the urea fertilizer. In contrast, NBPT which was applied to the urea fertilizer alone or with N,N,N',N'-tetramethyl-1,3-propanediamine exhibited poor stability.

Example 8

In this experiment, effectiveness of the inventive amine compound in inhibiting ammonia loss of urea was tested. In brief, 120 g of soil (sandy loam) were packed into glass bottles, with a moisture content of about 20%. Urea, urea sprayed with NBPT, or urea sprayed with combination of NBPT and the inventive amine compound (0.33 g of nitrogen in form of urea for all samples), was applied on the surface of the soil, respectively. Sponge with acid trapper inside was then placed on top of the soil. The $NH_3$ traps were then shaken and extracted in a 2M $K_2SO_4$ solution at 14 days after the experiment. The extract then was analysed for $NH_4^+$ content, and calculated as accumulated ammonia losses from urea. Results are shown in Table 2 below.

TABLE 2

| Formulation | Ammonia Losses |
|---|---|
| 26.5 wt % NBPT, 5 wt % TMBPA, add solvent to 100% | 15.7% |
| 26.5 wt % NBPT, add solvent to 100% | 18.23% |
| Solvent without NBPT nor TMBPA | 40.5% |

Results showed that the combination of NBPT and TMBPA effectively reduced the ammonia loss, compared to NBPT alone and the non-treated control group.

The invention claimed is:

1. A composition for use with a urea-containing fertilizer comprising:
(A) at least one (thio)phosphoric acid triamide of general formula (I) and/or (thio)phosphoric acid diamide of general formula (II)

$$R_1R_2N\text{—}P(X)(NH_2)_2 \quad (I)$$

$$R_1O\text{—}P(X)(NH_2)_2 \quad (II)$$

wherein X is oxygen or sulphur;
$R_1$ and $R_2$ is independently selected from the group consisting of hydrogen, substituted or unsubstituted 2-nitrophenyl, $C_{1-10}$ alkyl, $C_{3-10}$ cycloalkyl, $C_{3-10}$ heterocycloalkyl, $C_{6-10}$ aryl, $C_{6-10}$ heteroaryl and diaminocarbonyl, or $R_1$ and $R_2$, together with the nitrogen atom joining them, form a 5- or 6-membered saturated or unsaturated heterocyclic moiety, which optionally contains one or two further heteroatoms selected from the group consisting of nitrogen, oxygen and sulphur;

(B) at least one amine compound selected from:

(B1) a compound having the general formula (III)

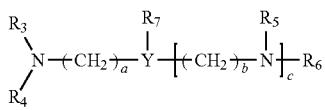
(III)

wherein:

Y is nitrogen or oxygen atom;

a and b is independently an integer of 2 to 6;

c is an integer of 2 to 10;

$R_3$, $R_4$, and $R_6$ is independently a $C_{1-4}$ alkyl or hydroxylalkyl group, a $C_{1-4}$ alkoxyl group;

$R_5$ is a $C_{1-4}$ alkyl or hydroxylalkyl group, a $C_{1-4}$ alkoxyl group or H;

$R_7$ is H, a $C_{1-4}$ alkyl or hydroxylalkyl group, a $C_{1-4}$ alkoxyl group when Y is nitrogen, $R_7$ is null when Y is oxygen;

(B2) a compound having the general formula (IV):

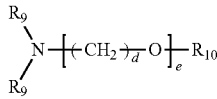
(IV)

wherein:

d is an integer of 2 to 6;

e is an integer of 3 to 50 when d=2, e is an integer of 1 to 50 when d=3-6;

$R_8$ and $R_9$, same or different, is a $C_{1-4}$ alkyl group, or $R_8$ and $R_9$, same or different, is a $C_{1-4}$ hydroxylalkyl group, or $R_8$ and $R_9$, same or different, is a $C_{1-4}$ alkoxyl group;

$R_{10}$ is H or a $C_{1-4}$ alkyl group;

(B3) 3-dimethylaminopropylamine (B4) a compound having the general formula (VI)

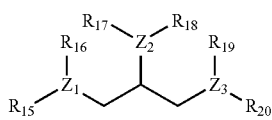
(VI)

wherein:

$Z_1$, $Z_2$, $Z_3$ is independently nitrogen or oxygen atom, wherein at least one of $Z_1$, $Z_2$, $Z_3$ is nitrogen atom;

$R_{15}$, $R_{16}$, $R_{17}$, $R_{18}$, $R_{19}$ and $R_{20}$ is independently a $C_{1-12}$ alkyl or hydroxylalkyl group, a $C_{1-12}$ alkoxyl group, H or null.

2. The composition according to claim 1, wherein the amine compound is according to the general formula (III)

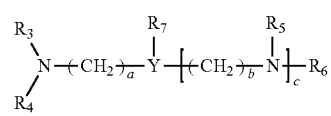
(III)

wherein:

Y is nitrogen or oxygen atom;

a and b is independently an integer of 2 to 6;

c is an integer of 2 to 10;

$R_3$, $R_4$, and $R_6$ is independently a $C_{1-4}$ alkyl or hydroxylalkyl group, a $C_{1-4}$ alkoxyl group;

$R_5$ is a $C_{1-4}$ alkyl or hydroxylalkyl group, a $C_{1-4}$ alkoxyl group or H;

$R_7$ is H, a $C_{1-4}$ alkyl or hydroxylalkyl group, a $C_{1-4}$ alkoxyl group when Y is nitrogen, $R_7$ is null when Y is oxygen.

3. The composition according to claim 2, wherein $R_3$, $R_4$, $R_5$ and $R_6$ as defined in the general formula (III) are independently a $C_{1-4}$ alkyl group.

4. The composition according to claim 1, wherein the amine compound is a compound having general formula (VII):

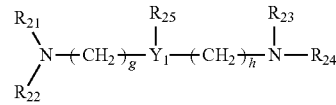
(VII)

wherein:

$Y_1$ is nitrogen or oxygen atom;

g and h is independently an integer of 2-6;

$R_{21}$, $R_{22}$, $R_{24}$ is independently a $C_{1-4}$ alkyl or hydroxylalkyl group, or a $C_{1-4}$ alkoxyl group;

$R_{23}$ is a $C_{1-4}$ alkyl or hydroxylalkyl group, a $C_{1-4}$ alkoxyl group or H;

$R_{25}$ is H, a $C_{1-4}$ alkyl or hydroxylalkyl group, a $C_{1-4}$ alkoxyl group when $Y_1$ is nitrogen; and $R_{25}$ is null when $Y_1$ is oxygen.

5. The composition according to claim 4, wherein $R_{21}$, $R_{22}$, $R_{23}$, $R_{24}$ as defined in the general formula (VII) are independently a $C_{1-4}$ alkyl.

6. The composition according to claim 1, wherein the amine compound is a compound having the general formula (IV)

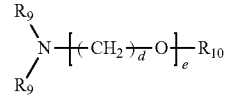
(IV)

wherein:

d is an integer of 2 to 6;

e is an integer of 3 to 50 when d=2, e is an integer of 1 to 50 when d=3-6;

$R_8$ and $R_9$, same or different, is a $C_{1-4}$ alkyl group, or $R_8$ and $R_9$, same or different, is a $C_{1-4}$ hydroxylalkyl group, or $R_8$ and $R_9$, same or different, is a $C_{1-4}$ alkoxyl group;

$R_{10}$ is H or a $C_{1-4}$ alkyl group.

7. The composition according to claim 1, wherein the amine compound is a compound having the general formula (VI)

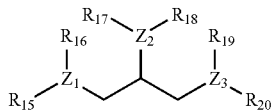
(VI)

wherein:
$Z_1$, $Z_2$, $Z_3$ is independently nitrogen or oxygen atom, wherein at least one of $Z_1$, $Z_2$, $Z_3$ is nitrogen atom;
$R_{15}$, $R_{16}$, $R_{17}$, $R_{18}$, $R_{19}$ and $R_{20}$ is independently a $C_{1-12}$ alkyl or hydroxylalkyl group, a $C_{1-12}$ alkoxyl group, H or null.

8. A composition for use with a urea-containing fertilizer comprising:
(A) at least one (thio)phosphoric acid triamide of general formula (I) and/or (thio)phosphoric acid diamide of general formula (II)

(I)

(II)

wherein X is oxygen or sulphur;
$R_1$ and $R_2$ is independently selected from the group consisting of hydrogen, substituted or unsubstituted 2-nitrophenyl, $C_{1-10}$ alkyl, $C_{3-10}$ cycloalkyl, $C_{3-10}$ heterocycloalkyl, $C_{6-10}$ aryl, $C_{6-10}$ heteroaryl and diaminocarbonyl, or $R_1$ and $R_2$, together with the nitrogen atom joining them, form a 5- or 6-membered saturated or unsaturated heterocyclic moiety, which optionally contains one or two further heteroatoms selected from the group consisting of nitrogen, oxygen and sulphur;
(B) at least one amine compound selected from:
(B1) a compound having the general formula (III)

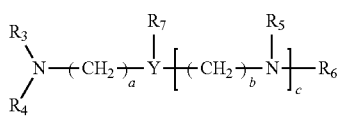
(III)

wherein:
Y is nitrogen or oxygen atom;
a and b is independently an integer of 2 to 6;
c is an integer of 1 to 10;
$R_3$, $R_4$, and $R_6$ is independently a $C_{1-4}$ alkyl or hydroxylalkyl group, a $C_{1-4}$ alkoxyl group;
$R_5$ is a $C_{1-4}$ alkyl or hydroxylalkyl group, a $C_{1-4}$ alkoxyl group or H;
$R_7$ is H, a $C_{1-4}$ alkyl or hydroxylalkyl group, a $C_{1-4}$ alkoxyl group when Y is nitrogen, $R_7$ is null when Y is oxygen;
(B2) a compound having the general formula (IV):

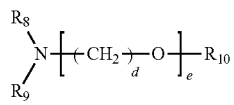
(IV)

wherein:
d is an integer of 2 to 6;
e is an integer of 2 to 50 when d=2, e is an integer of 1 to 50 when d=3-6;
$R_8$ and $R_9$, same or different, is a $C_{1-4}$ alkyl group, or $R_8$ and $R_9$, same or different, is a $C_{1-4}$ hydroxylalkyl group, or $R_8$ and $R_9$, same or different, is a $C_{1-4}$ alkoxyl group;
$R_{10}$ is H or a $C_{1-4}$ alkyl group;
(B3) 3-dimethylaminopropylamine
(B4) a compound having the general formula (VI)

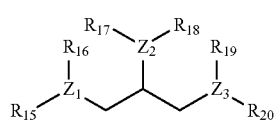
(VI)

wherein:
$Z_1$, $Z_2$, $Z_3$ is independently nitrogen or oxygen atom, wherein at least one of $Z_1$, $Z_2$, $Z_3$ is nitrogen atom;
$R_{15}$, $R_{16}$, $R_{17}$, $R_{18}$, $R_{19}$ and $R_{20}$ is independently a $C_{1-12}$ alkyl or hydroxylalkyl group, a $C_{1-12}$ alkoxyl group, H or null, wherein the amine compound is a compound having the general formula (VIII):

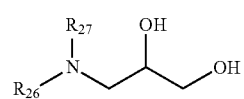
(VIII)

wherein:
$R_{26}$ and $R_{27}$ is independently a $C_{1-12}$ alkyl or hydroxylalkyl group, a $C_{1-12}$ alkoxyl or H.

9. The composition according to claim 1, wherein the amine compound is selected from the group consisting of:
3,3'-iminobis(N,N-dimethylpropylamine) (TMBPA);
3-dimethylaminopropylamine (DMAPA);
3-am inopropane-1,2-diol;
1-[bis[3-(dimethylamino)propyl]amino]-2-propanol;
bis[2-(N,N-dimethylamino)ethyl] ether;
2-(2-(dimethylam ino)ethoxy)ethanol;
N,N,N',N'',N''-pentamethyldiethylene triamine, and mixtures thereof.

10. The composition according to claim 1, wherein the amine compound is selected from the group consisting of 3,3'-iminobis(N,N-dimethylpropylamine), 1-[bis[3-(dimethylamino)propyl]amino]-2-propanol, bis[2-(N, N-dimethylamino)ethyl] ether, N, N, N',N'', N''-pentamethyldiethylene triamine, and mixtures thereof.

11. The composition according to claim 1, wherein component (A) is N-alkylthiophosphoric acid triamide or N-alkylphosphoric acid triamide.

12. The composition according to claim 1, wherein component (A) is N-(n-butyl)thiophosphoric acid triamide (NBPT).

13. The composition according to claim 1, wherein the composition further comprises a solvent.

14. The composition according to claim 13, wherein said solvent is a compound having the general formula (X):

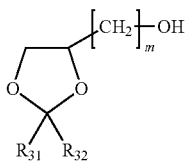

(X)

wherein:

m is an integer of 1 to 10;

$R_{31}$ and $R_{32}$ is independently H, a $C_{1-10}$ alkyl group, a $C_{1-10}$ alkenyl group, or a phenyl group.

15. The composition according to claim 1, wherein the component (B) is present in an amount of 2% to 25% by weight based on the total weight of the composition.

16. A composition for use with a urea-containing fertilizer comprising:

(A) at least one (thio)phosphoric acid diamide of general formula (II)

(II)

wherein X is oxygen or sulphur;

$R_1$ and $R_2$ is independently selected from the group consisting of hydrogen, substituted or unsubstituted 2-nitrophenyl, $C_{1-10}$ alkyl, $C_{3-10}$ cycloalkyl, $C_{3-10}$ heterocycloalkyl, $C_{6-10}$ aryl, $C_{6-10}$ heteroaryl and diaminocarbonyl, or $R_1$ and $R_2$, together with the nitrogen atom joining them, form a 5- or 6-membered saturated or unsaturated heterocyclic moiety, which optionally contains one or two further heteroatoms selected from the group consisting of nitrogen, oxygen and sulphur;

(B) at least one amine compound selected from:

(B1) a compound having the general formula (III)

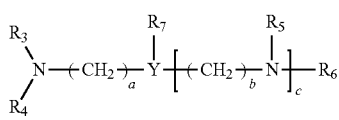

(III)

wherein:

Y is nitrogen or oxygen atom;

a and b is independently an integer of 2 to 6;

c is an integer of 1 to 10;

$R_3$, $R_4$, and $R_6$ is independently a $C_{1-4}$ alkyl or hydroxylalkyl group, a $C_{1-4}$ alkoxyl group;

$R_5$ is a $C_{1-4}$ alkyl or hydroxylalkyl group, a $C_{1-4}$ alkoxyl group or H;

$R_7$ is H, a $C_{1-4}$ alkyl or hydroxylalkyl group, a $C_{1-4}$ alkoxyl group when Y is nitrogen, $R_7$ is null when Y is oxygen;

(B2) a compound having the general formula (IV):

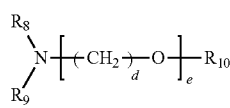

(IV)

wherein:

d is an integer of 2 to 6;

e is an integer of 2 to 50 when d=2, e is an integer of 1 to 50 when d=3-6;

$R_8$ and $R_9$, same or different, is a $C_{1-4}$ alkyl group, or $R_8$ and $R_9$, same or different, is a $C_{1-4}$ hydroxylalkyl group, or $R_8$ and $R_9$, same or different, is a $C_{1-4}$ alkoxyl group;

$R_{10}$ is H or a $C_{1-4}$ alkyl group;

(B3) a compound having the general formula (V)

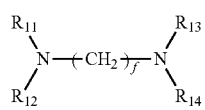

(V)

wherein:

f is an integer of 3 to 6;

$R_{11}$ and $R_{12}$ is independently a $C_{1-4}$ alkyl or hydroxylalkyl group, or a $C_{1-4}$ alkoxyl group;

$R_{13}$ and $R_{14}$ is independently a $C_{1-4}$ alkyl or hydroxylalkyl group, a $C_{1-4}$ alkoxyl group or H;

(B4) a compound having the general formula (VI)

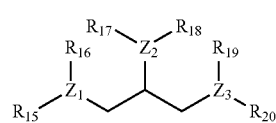

(VI)

wherein:

$Z_1$, $Z_2$, $Z_3$ is independently nitrogen or oxygen atom, wherein at least one of $Z_1$, $Z_2$, $Z_3$ is nitrogen atom;

$R_{15}$, $R_{16}$, $R_{17}$, $R_{18}$, $R_{19}$ and $R_{20}$ is independently a $C_{1-12}$ alkyl or hydroxylalkyl group, a $C_{1-12}$ alkoxyl group, H or null.

17. A composition for use with a urea-containing fertilizer comprising:

(A) at least one (thio)phosphoric acid triamide of general formula (I) and/or (thio)phosphoric acid diamide of general formula (II)

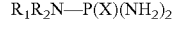

(I)

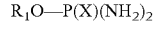

(II)

wherein X is oxygen or sulphur;

$R_1$ and $R_2$ is independently selected from the group consisting of hydrogen, substituted or unsubstituted 2-nitrophenyl, $C_{1-10}$ alkyl, $C_{3-10}$ cycloalkyl, $C_{3-10}$ heterocycloalkyl, $C_{6-10}$ aryl, $C_{6-10}$ heteroaryl and diaminocarbonyl, or $R_1$ and $R_2$, together with the nitrogen atom joining them, form a 5- or 6-membered saturated or unsaturated heterocyclic moiety, which optionally contains one or two further heteroatoms selected from the group consisting of nitrogen, oxygen and sulphur;

(B) at least one amine compound wherein the amine compound is a compound having general formula (VII):

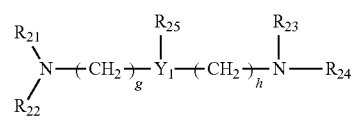

(VII)

wherein:

$Y_1$ is nitrogen or oxygen atom;

g and h is independently an integer of 2-6;

$R_{21}$, $R_{22}$, $R_{24}$ is independently a hydroxylalkyl group, or a $C_{1-4}$ alkoxyl group;

$R_{23}$ is a hydroxylalkyl group, a $C_{1-4}$ alkoxyl group or H;

$R_{25}$ is H, a $C_{1-4}$ alkyl or hydroxylalkyl group, a $C_{1-4}$ alkoxyl group when $Y_1$ is nitrogen; and $R_{25}$ is null when $Y_1$ is oxygen.

* * * * *